(12) United States Patent
Hall

(10) Patent No.: US 6,619,246 B2
(45) Date of Patent: Sep. 16, 2003

(54) ELECTROMAGNETIC VALVE ACTUATORS

(76) Inventor: Keith Gordon Hall, 80 Highfield Lane, Maidenhead, Berkshire, SL6 3PF (GB)

( * ) Notice: Subject to any disclaimer, the term of this patent is extended or adjusted under 35 U.S.C. 154(b) by 0 days.

(21) Appl. No.: 10/287,861

(22) Filed: Nov. 4, 2002

(65) Prior Publication Data
US 2003/0094149 A1 May 22, 2003

(30) Foreign Application Priority Data
Nov. 22, 2001 (GB) .............................................. 0128049

(51) Int. Cl.$^7$ ................................................. F01L 9/04
(52) U.S. Cl. ................................. 123/90.11; 123/90.14; 251/129.16; 251/129.01
(58) Field of Search ........................ 123/90.11, 90.14, 123/90.24; 251/129.01, 129.03, 129.16, 129.2; 335/220, 238, 255

(56) References Cited
U.S. PATENT DOCUMENTS 5,943,988 A * 8/1999 Burger et al. ............. 123/90.11
6,415,751 B2 * 7/2002 Meissner et al. ........ 123/90.11

* cited by examiner

Primary Examiner—Thomas Denion
Assistant Examiner—Kyle Riddle
(74) Attorney, Agent, or Firm—Bachman & LaPointe, P.C.

(57) ABSTRACT

A device for actuating a gas exchange valve of an internal combustion engine or gas generator comprises an armature which is operatively connected to the valve stem of a valve member and which is disposed in a chamber between opposed pole faces of a valve closing electromagnet and a valve opening electromagnet. A gas pressure source is connected by a supply line to the chamber. When the electromagnet is energized, it is effective to act on the armature to move the valve member to the closed position. The arrangement is such that reduction of the electromagnetic force exerted on the armature by the electromagnet is effective to enable the gas pressure from the source to move the valve member to the open position. This opening movement of the valve member may be assisted by energizing the opening electromagnet. Movement of the valve member from the open to the closed position may be assisted by a return spring. The valve actuator minimizes the electric power consumption for the electromagnets. In an alternative embodiment, the opening electromagnet is dispensed with and valve movement is achieved by the electromagnet in the closing direction and gas pressure in the opening direction.

10 Claims, 4 Drawing Sheets

DIAGRAM A

DIAGRAM B

ELECTROMAGNETIC VALVE ACTUATORS

FIELD OF THE INVENTION

This invention relates to electromagnetic valve actuators for internal combustion engines or gas generators.

BACKGROUND OF THE INVENTION

Existing proposals use counteracting spring pairs to power the valve from extreme positions. At static equilibrium the valve is half open. The disadvantage of spring power is that the rising force with displacement characteristic results in the need for powerful electromagnets using a 42V supply. A high current initiation pulse is also required to close the valve from the equilibrium position.

A second issue is the requirement to simultaneously seat the valve and armature when the assembly is naturally subjected to differential thermal expansion, manufacturing tolerances and seat wear. Moreover, the landing velocity must be controlled to less than 0.15 m/s to minimize contact noise.

SUMMARY OF THE INVENTION

The object of this invention is to solve the problems encountered with the existing proposals by providing a valve actuator which minimizes electrical power requirements so that engine valves can be controlled using existing low voltage vehicle systems.

According to the invention, there is provided a device for actuating a gas exchange valve of an internal combustion engine or gas generator, said device comprising an armature operatively connected to the valve stem of a valve member and at least one electromagnet arranged to act on the armature to move the valve member from the open to the closed position, wherein the armature is disposed in a chamber and wherein a gas pressure source is connected by a supply line to the chamber, the arrangement being such that reduction of the electromagnetic force on the valve member in the closing direction is effective to enable the gas pressure from said gas pressure source to move the valve member to the open position.

By utilizing gas pressure to open the valve, the power consumption of the electromagnets is greatly reduced because this is only used to close the valve. Return of the valve member to the closed position may be assisted by a return spring.

Elimination of the opening electromagnet also provides the opportunity to use fixed real time valve events to self supercharge the engine using standing pressure waves in fixed geometry exhaust and intake pipes independent of engine speed.

According to one embodiment of the invention, a second electromagnet is provided to assist in moving the valve member to the open position. In this embodiment, the valve opening and closing electromagnets are axially spaced and have opposing pole faces, the armature being disposed in the chamber between said pole faces.

The gas pressure provides an approximately constant force to open the valve, so that the electromagnet does not have to hold against the maximum force of a rising force system such as a coil spring. Further reductions in electromagnetic holding power are possible in systems without an opening electromagnet.

Preferably, a seal is provided between contact faces of the armature and closing electromagnet so that the area of the armature exposed to the gas pressure in the closed position of the valve is less than the total area of the armature. Such use of differential armature areas acted on by the gas pressure, dependent on its open or closed position, further reduces the electromagnetic holding power in proportion to the ratio of the areas.

The seal is preferably flexible in the axial direction and is arranged to be contacted by the armature in the closing direction of the valve member before the armature makes contact with the pole face of the closing electromagnet. Alternatively, the valve seat may be so disposed in relation to the pole face that the armature does not necessarily contact the pole face when the valve is closed.

A unidirectional seal is desirably provided between the armature and the chamber.

The return spring is desirably located in a compression chamber formed between the opening electromagnet and a stem of the valve member. A seal may be provided between the armature and the pole face of the opening electromagnet to reduce the armature area enclosing the compression chamber and thus the electromagnetic holding force required in the open position of the valve member.

The valve stem may be of tubular construction with exit ports in order that said valve stem can also function as a gas supply passage.

BRIEF DESCRIPTION OF THE DRAWINGS

The invention will now be described in detail, by way of example, with reference to the drawings, in which.

DESCRIPTION OF PREFERRED EMBODIMENTS

Figure 1:
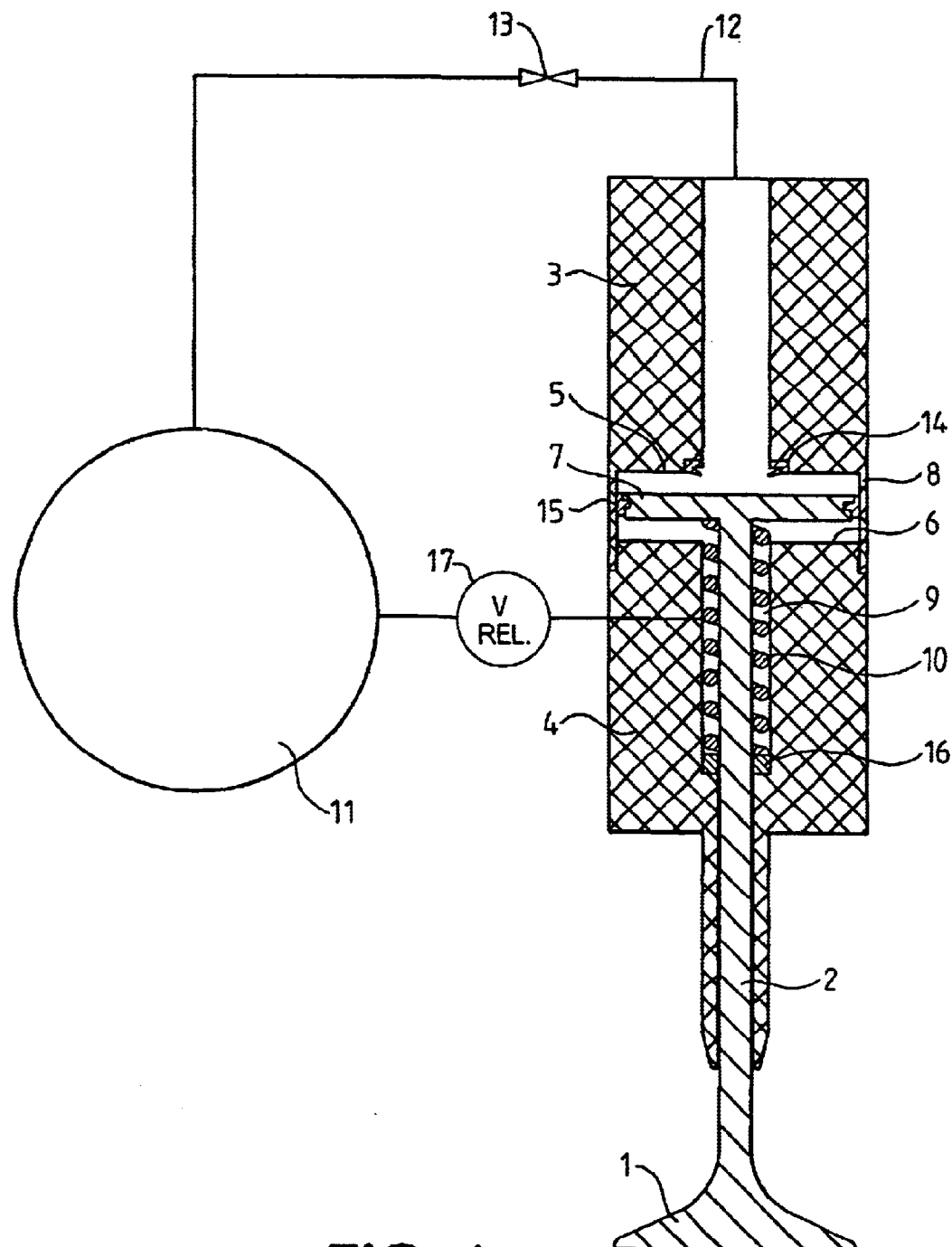
FIG. 1 is a diagrammatic representation of one embodiment of a valve actuator according to the invention.

Reference will first be made to FIG. 1 of the drawings in which a device for actuating a gas exchange valve 1 having a valve stem 2 of an internal combustion engine comprises axially spaced valve closing and valve opening electromagnets 3 and 4 respectively having respective opposing pole faces 5 and 6. An armature 7 is disposed in a chamber 8 between the opposed pole faces 5 and 6 so as to be axially movable therebetween and is operatively connected to the valve stem 2 for opening and closing the valve 1. A compression chamber 9 is formed between the valve stem 2 and the opening electromagnet 4 and a return spring 10 for biasing the valve in the closing direction surrounds the valve stem and is located in the chamber 9. A gas pressure source 11 is connected by a supply line 12 to the chamber 8 via a passage through the closing electromagnet 3 and a vented shut down valve 13 is provided in the supply line 12. The valve 13 is normally closed when the engine is not operational.

A supply port seal 14 decreases the armature area acted on by the gas supply pressure when the gas exchange valve 1 is in the closed position in order to minimize the holding force required by the closing electromagnet 3. Reduction of the holding current initiates armature/valve displacement under the action of feed pressure. Disengagement of the port seal 14 following initial armature displacement exposes the full armature area to the feed pressure, accelerating valve opening and compressing the gas and the spring in the compression chamber. The seal 14 is flexible in the axial direction and is arranged to be contacted by the armature 7 in the closing direction of the valve 1 before the armature 7 makes contact with the pole face 5. The seal 14 may be such that it prevents actual contact between the armature 7 and the pole face 5. A unidirectional armature seal 15 and a valve stem seal 16 minimize leakage from the compression chamber 9.

The opening electromagnet is energized in order to hold the gas exchange valve 1 open. The compression chamber area acting on the armature 7 is reduced by the pole face area 5 in contact with the armature, thus minimizing the required holding force of the opening electromagnet. Reducing the holding current of the opening electromagnet initiates valve closing under the influence of differential pressure across the armature 7. Hysteresis losses are overcome and the armature returned to the closed position against the port seal by energizing the closing electromagnet with a current pulse. The timing of this current pulse may be varied in order to soft-land the armature on the port seal. Feed gas trapped outside the port seal may leak past the armature to the compression chamber using the unidirectional armature seal 15. The current pulse then subsides to its holding value.

Excess return chamber gas is vented via a relief valve 17. The gas pressure supply passage 12 may be vented to atmosphere on engine shut down via the shut down valve 13 so that the gas exchange valve 1 is seated under the action of the valve closing spring 10.

Contact of the armature with the pole face of the electromagnet is not essential, and the flexible port seal may accommodate differential thermal expansion of the assembly.

The exhaust valve is required to open against cylinder pressure at the end of expansion, thus requiring more force to open than the inlet valve. The port seal area and/or the feed pressure may be increased to increase the opening force. Moreover, the variable valve timing available from electromagnetic actuators facilitates reduction of the compression volume (Miller cycle). The effect is to increase the ratio of expansion to compression and thus reduce the cylinder pressure at the end of expansion and hence the valve opening force required. There are also thermal efficiency gains.

Figure 2:
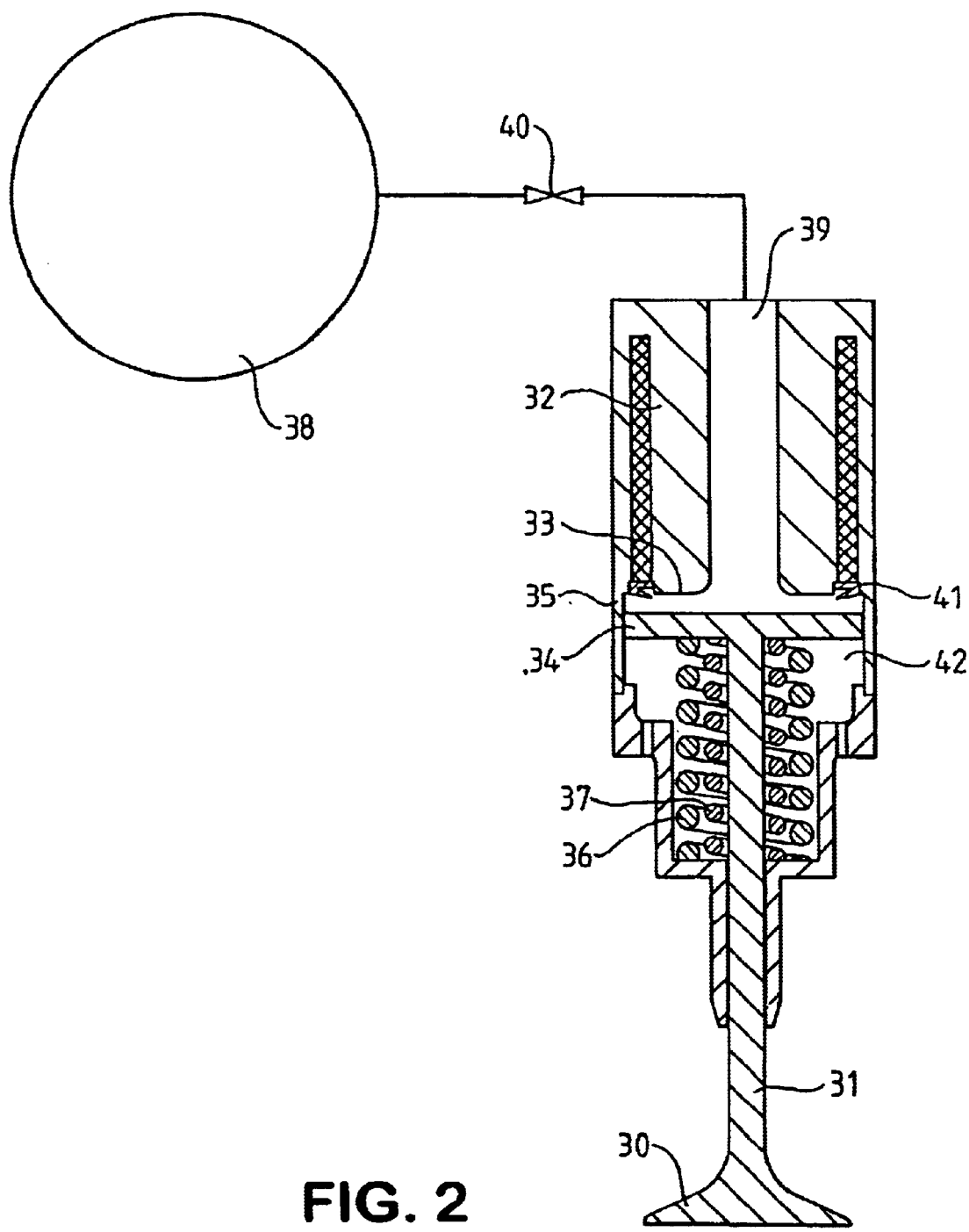
FIG. 2 is a diagrammatic representation of a second embodiment of a valve actuator according to the invention.

FIG. 2 of the drawings shows a single coil version in which the periodic time of the valve open phase is characterized by known spring/mass/damper principles. Of particular significance is an open valve period of fixed time duration because it permits intake and exhaust system tuning using fixed geometry pipes, independent of engine speed. By way of example FIG. 2 shows a valve-actuating device using a single electromagnet. A gas exchange valve 30 having a valve stem 31 comprises a closing electromagnet 32 and pole face 33, an armature 34 disposed in an armature chamber 35 so as to be axially movable therein and being operatively connected to said valve stem 31 for opening and closing the gas exchange valve 30, springs 36 and 37 for biasing said valve in a closing direction, a gas pressure source 38 and a supply line 39 for biasing said valve in an opening direction. A vented shut down valve 40 is provided in the supply line 39 and is normally closed when the engine is not operational.

A supply port seal 41 decreases the armature area acted on by the gas supply pressure when the gas exchange valve 1 is in the closed position in order to minimize the holding force required by the closing electromagnet 32. Reduction of the holding current initiates armature/valve displacement under the action of feed pressure. Disengagement of the port seal 41 following initial armature displacement exposes the full armature area to feed pressure, accelerating valve opening and compressing the springs 36 and 37 in a spring chamber 42 that may be vented. Again, the seal 41 may be flexible in the axial direction and be arranged to be contacted by the armature 34 in the closing direction of the valve 30 before the armature makes contact with the pole face 33. The seal 41 may also prevent actual contact between the armature 34 and the pole face 33.

The stored spring energy returns said armature/gas exchange valve in the closing direction against the supply feed pressure aided by a current pulse to the closing electromagnet in order to soft land said gas exchange valve on its seat and bring the armature 34 into contact with the supply port seal 41. In the closed position, a vent path for the pressure acting on the outer annulus of the armature 34 is required in order to create the differential area, enabling the current to the closing electromagnetic valve to be reduced to the holding value. The pneumatic pressure may be varied in order to change the valve lift.

4-stroke applications using a single electromagnetic actuator may require variable valve event times. To achieve this for a fixed dynamic mass, either the spring force or the damping is required to vary according to known spring mass damper principles. Regulation of the gas supply pressure would effect variation of the gas supply force. Variable damping would require the addition of a damping chamber to the dynamic mass with a variable bleed orifice.

Figure 3:
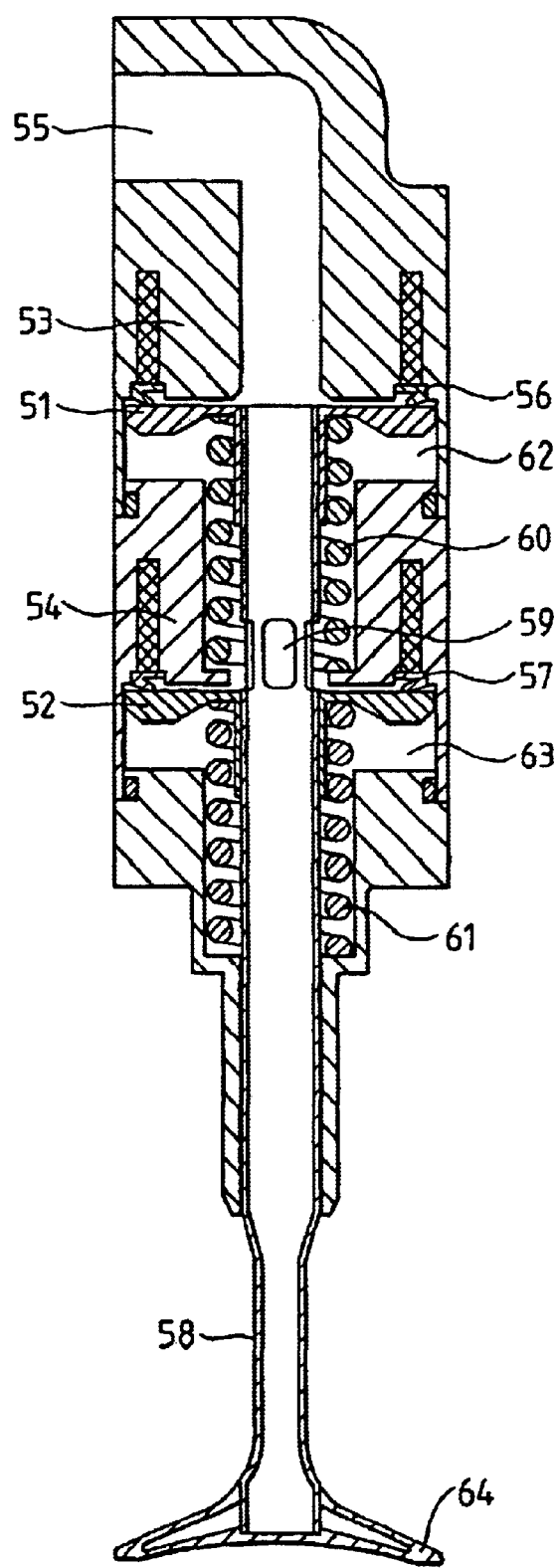
FIG. 3 is a vertical section through a third embodiment of a valve actuator according to the invention.

FIG. 3 shows a gas exchange valve assembly embodying multiple armatures 51, 52 in order to increase the available electromagnetic force within the available package space. By way of this example, two closing electromagnets 53, 54 are employed against the opening gas pressure in a supply passage 55 acting on areas of armatures 51, 52 enclosed by port seals 56, 57. A valve stem 58 is of tubular construction in order that gas pressure may be conveyed to the armature 52 via ports 59. Springs 60, 61 support the valve mass in order that the valve remains closed in the absence of electromagnetic force and gas pressure, for example when the engine is shut down. The springs 60, 61 may also aid the location of armatures 51, 52 on the valve stem 58 against supply port seals 56, 57 as the bonding adhesive between said armatures and stem cures following initial assembly. Springs 60, 61 and compression chambers 62, 63 provide the return force aided by electromagnets 53, 54. In this embodiment, the circumferential clearances around the armatures 51, 52, and valve stem 58 determine leakage rates during valve motion. A gas exchange valve 64 is attached to valve stem 58 which may be reduced in section in the region of the gas exchange passage (not shown).

Figure 4:
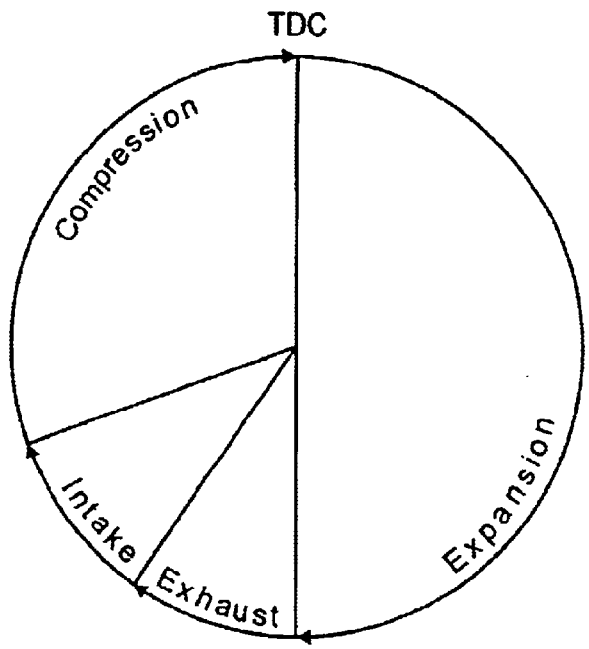
FIG. 4 shows engine timing diagrams combining fixed time valve events with return stroke inductions.
Figure 4:
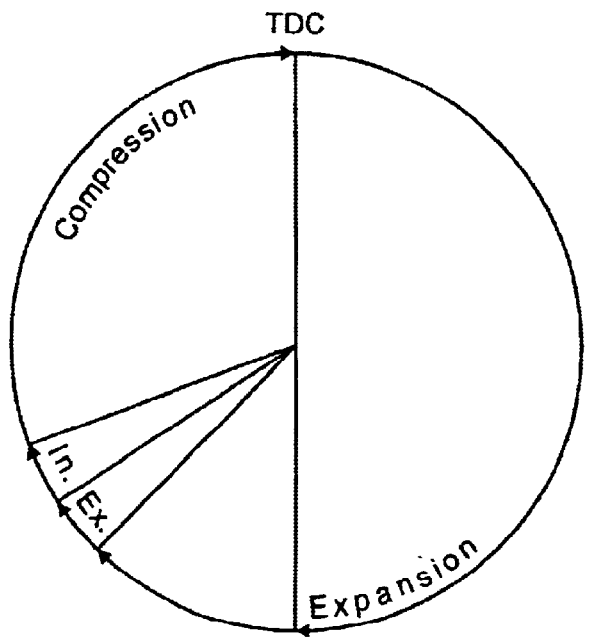

FIG. 4 shows engine timing diagrams for an engine using return stroke induction (patent EP 0 493 135 B1) in conjunction with valve open phases fixed in real time. Diagram 'A' illustrates an expansion phase extended beyond the compression phase in order to complete additional expansion work and reduce the combustion force acting on the exhaust valve at the time of opening. This further reduces the required exhaust valve actuator power.

Diagram 'B' of FIG. 4 shows the effect of fixed valve event time at low engine speed. The intake and exhaust phases occupy only a very small proportion of the timing diagram and recompression is introduced into the expansion phase in order to complete the timing circle. Hence the exhaust valve opening is retarded until after bottom dead centre.

The use of a gas pressure feed source requires a means of replenishment from a compressor. A further use of variable valve timing is that one or more engine cylinders could be timed to function as compressors to replenish the gas pressure source. The function of a cylinder as a compressor may be permanent or intermittent. To function as a compressor, a delivery valve is required. The deceleration mode can be made productive by generating pressurized gas. In an automobile this would result in less use of the brakes and thus increased efficiency.

Compressor cylinder performance using fixed event time delivery valves may be improved by applying variable event time to the inlet valves, or introducing multiple valve events into each phase.

Stratified charge combustion may be achieved with the aid of air injection. Such an injector may be also function as a delivery valve in the compressor mode. In a further enhancement, the gas used for injection may be pressurized oxygen.

With a gas pressure source available, this energy may be used for other duties. In an automotive example the efficiency of many functions may be improved by operating intermittently rather than continuously. Such functions include power steering and cooling fan. The electrical load may benefit from an alternative power source for such functions as wipers and window openers etc.

It will thus be seen that the valve actuator according to the invention minimizes the electrical power consumption for the electromagnet(s) by reducing the required holding force in two ways. Firstly, by employing a constant force characteristic which gives up to 50% reduction and secondly by using differential areas to reduce the electromagnetic holding force.

The embodiment shown in FIG. 2 using a single actuating electromagnet makes it possible to achieve a valve open duration fixed in real time. This facilitates optimized self-supercharging using pulse tuning effects from fixed geometry exhaust and intake manifolds independent of engine speed. These characteristics are particularly beneficial in the valved 2-stroke Miller cycle engine described in patent European Patent Specification No 0493135B1 in which charging takes place during decreasing cylinder volume.

The invention is not restricted to the above described embodiments but variations and modifications may be made without departing from the spirit and scope of the invention.

I claim:

1. A device for actuating a gas exchange valve of an internal combustion engine or gas generator, said valve including a valve member having a valve stem, in which said device comprises an armature operatively connected to the valve stem of the valve member and at least one electromagnet arranged to act on the armature to move the valve member from the open to the closed position, wherein the armature is disposed in a chamber and wherein a gas pressure source is connected by a supply line to the chamber, the arrangement being such that reduction of electromagnetic force on the valve member in the closing direction is effective to enable gas pressure from said gas pressure source to move the valve member to the open position.

2. A device as claimed in claim 1, in which a second electromagnet is provided to assist in moving the valve member from the closed to the open position.

3. A device as claimed in claim 2, in which the electromagnets are axially spaced and have opposing pole faces, the armature being disposed in the chamber between said pole faces.

4. A device as claimed in claim 1, in which a seal is provided between contact faces of the armature and the valve closing electromagnet whereby the area of the armature exposed to the gas pressure in the closed position of the valve member is less than the total area of the armature.

5. A device as claimed in claim 4, wherein the seal is arranged to be contacted by the armature in the closing direction of the valve member before the armature makes contact with the face of the closing electromagnet.

6. A device as claimed in claim 1, wherein a spring is provided to assist movement of the valve member from the open to the closed position.

7. A device as claimed in claim 1, wherein the valve stem is of tubular construction with exit ports in order that the valve stem can also function as a gas supply passage.

8. A device as claimed in claim 1, wherein a unidirectional seal is provided between the armature and the chamber.

9. An internal combustion engine having the device claimed in claim 1 and arranged to operate with fixed periodic valve open times.

10. A gas generator having the device claimed in claim 1 and arranged to operate with fixed periodic valve open times.

* * * * *